United States Patent
Uffner

[15] 3,674,757
[45] July 4, 1972

[54] OLEFIN EXTRUSION COMPOSITIONS AND METHOD OF PREPARING SAME

[72] Inventor: Melville W. Uffner, Media, Pa.
[73] Assignee: Air Products and Chemicals, Inc., Philadelphia, Pa.
[22] Filed: July 17, 1970
[21] Appl. No.: 55,990

[52] U.S. Cl. ..................260/86.7, 260/45.9 R, 260/87.3, 260/88.1, 260/88.2, 260/93.7, 260/94.9 GB
[51] Int. Cl. .......................................................C08f 29/04
[58] Field of Search.........260/88.2, 93.7, 94.9 GD, 94.9 GB; 252/8.8

[56] References Cited

UNITED STATES PATENTS 3,382,097  5/1968  Erby et al. ...........................117/141

Primary Examiner—Joseph L. Schofer
Assistant Examiner—Edward J. Smith
Attorney—B. Max Klevit and David T. Nikaido

[57] ABSTRACT

A fluorochemical, perfluorocyclohexanoyl glycine, is blended at low concentrations with olefin polymers to obtain an extrudable composition having advantageous repellency characteristics.

9 Claims, No Drawings

OLEFIN EXTRUSION COMPOSITIONS AND METHOD OF PREPARING SAME

BACKGROUND OF THE INVENTION

The present invention relates to extrudable compositions prepared by blending a fluorochemical at low concentrations with olefin polymers and more particularly, to imparting repellency characteristics to extrudable compositions by blending perfluorocyclohexanoyl glycine at low concentrations with olefin polymers which are to be extruded.

Olefin polymers, such as polyethylene, are used extensively in food and industrial packaging applications, particularly in the form of coatings on paper, paper board; cellophane and other plastic films; metal foil; cloth; and other substrates. The main contributions of these coatings include a heat-sealable surface, increased tear and crease resistance, and a moisture barrier. Such olefin polymers, however, have the serious drawback of being permeable to oils and greases. In order to increase the oleophobicity of the olefin polymers it has been necessary to subject the polymers to some form of surface treatment, such as overcoating the surface with polyvinylidene chloride. Surface treatments entail at least one additional processing step and normally require the presence of driers to flash off the water or solvent which is used as a vehicle during the surface treatment operation.

SUMMARY OF THE INVENTION

An object of the present invention is to provide an extrudable olefin composition having advantageous repellency characteristics.

Another object of the present invention is to provide an olefin composition which can be extruded or blown and which has a high degree of imperviousness to oils and greases.

Still another object of the present invention is to provide a unique blend of fluorochemical and olefin polymer which has greater oleophobicity than the olefin polymer alone.

These and further other objects, advantages and features of the invention are obtained by physically blending a small quantity (0.1 to 5 percent by weight) of perfluorocyclohexanoyl glycine ($C_6F_{11}CONHCH_2CO_2H$, melting in the range of 128° to 134° C.) with the desired olefin polymer until a homogeneous blend is obtained. Advantageously, this is done by blending the perfluorocyclohexanoyl glycine into a melt of the olefin polymer. The resulting blend can be extruded or blown in accordance with standard procedures known in the art. Since the perfluorocyclohexanoyl glycine can be blended with the olefin polymer at the same time other additives, such as antistats, lubricants, etc., are incorporated with the olefin polymer and since such operations are normally done prior to extrusion or blowing, the need for a multiple coating station and costly driers is eliminated.

DESCRIPTION OF THE PREFERRED EMBODIMENTS

In a preferred embodiment of the invention, the olefin polymer typically in the form of chunks or powder is fed into a cell of a kneading-type blender, such as a sigma blade blender. The cell is then heated to the softening temperature of the olefin polymer. When the olefin polymer is completely melted the perfluorocyclohexanoyl glycine is added to the cell and the blending is continued at the same temperature until a uniform or homogenous blend of the fluorochemical and olefin polymer is effectuated. Typically, cell temperatures in the neighborhood of 120° to 135° C. are employed; the temperature being limited by such considerations as thermal degradation of the olefin polymer, the softening points of the olefin polymer and the fluorochemical and other conditions for rapid and effective blending.

The resulting olefin polymer-fluorochemical blend can then be extruded or blown. Normally, in extrusion operations the blend, after being subjected to heat and pressure inside a cylinder, is extruded through the narrow slit of an extrusion coating die. The slit is straight lined-shaped and the emerging hot film has the form of a thin sheet. Upon leaving the die, the molten film is drawn down into the nip between the two rolls below the die, viz., the driven, water-cooled chill roll and the rubber-covered pressure roll. These two rolls are the center of the extrusion coating process. Here, while coming into contact with the faster moving substrate, such as a plastic film or paper, the hot film is drawn out to the desired thickness, or gauge, and forced onto the substrate when both layers are pressed together by the two rolls. The pressure is generally maintained between 50 to 100 pounds per linear inch. The combination of substrate and extruded film is then rapidly cooled by the chill roll.

Obviously, good mixing of the heated olefin polymer is essential for obtaining a good coating with no defects or blemishes recognizable by either the naked eye or testing tools. Among the defects which may be encountered because of poor mixing in conventional operations include pin holes, which make ordinary olefin polymer coatings permeable to grease, chemicals, moisture and vapor.

In addition to improving the oleophobicity of the olefin polymer, the fluorochemical employed herein improves the extrudability and release of the polymer from metal parts. It has also been observed that the heat stability of polyethylene, for example, is improved by the addition of the perfluorocyclohexanoyl glycine.

Any olefin polymer, including polyolefins and olefin copolymers, which may be extruded or blown can be used as the olefin polymer in the present invention. Such polymers particularly include high density and low density polyethylene, high and low density polypropylene, ethylene-vinyl acetate copolymers, ethylene-acrylate copolymers, such as ethylene-ethyl acrylate copolymer, ethylene-acrylic acid copolymer, propylene-methacrylic acid copolymer, and the like.

As indicated above, only small quantities of fluorochemical are required in order to impart the desired repellency characteristics to the olefin polymers. In general, between 0.1 to 5 percent by weight of the perfluorocyclohexanoyl glycine is sufficient to obtain the desired results and preferably between 0.5 to 2 percent by weight of the perfluorocyclohexanoyl glycine is employed. The actual preparation of the perfluorocyclohexanoyl glycine can be accomplished in accordance with the following procedure:

150 grams of glycine, 400 milliters of water and 320 grams of sodium hydroxide (50% solution) are added to a 2-liter flask equipped with a 500 c.c. dropping funnel, mechanical stirrer and a condenser. Perfluorocyclohexanoyl fluoride (328 grams) is then added to the dropping funnel. The acid fluoride is added dropwise over a 3-½ hour period to the stirred flask which is maintained at an internal temperature of 10° C. Dark brown solids are formed during this reaction. The heterogeneous mixture is then allowed to stand at room temperature over-night. The organic layer (which is the top layer) in the flask is separated from the aqueous or bottom layer. The aqueous layer is then extracted with diethyl ether and the other extracts are added to the organic layer. The resulting organic layer is then acidified with excess aqueous hydrochloric acid and dried over magnesium sulfate. Dark brown solids obtained during the process are recrystallized twice from benzene to provide in low yield a light tan solid which is perfluorocyclohexanoyl glycine, melting at 128° to 134° C.

The effectiveness of the blends of fluorochemical and olefin polymer of the present invention is demonstrated in the following examples. It will be understood that these examples are intended to be illustrative and are not intended to be limiting.

EXAMPLE I

Perfluorocyclohexanoyl glycine was thoroughly blended with polyethylene (melt index 22, density 0.915 and Vicat softening temperature of about 82° C.). It will be seen from the following table that the addition of small amounts of the fluorochemical dramatically increased the oleophobicity of the control material, polyethylene. TAPPI T 507su-68 test, using peanut oil as the reagent, was employed to determine the effectiveness of the blends of the present invention. It will be understood that PE designates the polyethylene employed and FC designates the fluorochemical employed.

| Composition of film 2 mils thick | Peanut Oil Holdout Hours at 60°C. |
|---|---|
| PE | 48 |
| PE + 0.75% FC | 59 |
| PE + 1.00% FC | 68 |
| PE + 2.00% FC | 92 |

All of the films were heat sealable at from about 93° C. to about 99° C. on a Sentinel Heat Sealer set at 30 psi for one second, dwell time, using a one-fourth inch bar. Therefore, the presence of the fluorochemical did not deleteriously affect the inherent heat sealability of the polyethylene. What was accomplished was a dramatic increase in the oleophobicity of the polyethylene composition.

The fluorochemical, perfluorocyclohexanoyl glycine, did impart a slight haze to the polyethylene. This haze was not objectionable, however.

Although, ideally, extruded films and coating should be pin hole free, the presence of fluorochemical in the polyethylene imparts holdout even if minute pin holes occur. This is because oil cannot wet and wick through the pinhole when it has a fluorochemical surface exposed.

EXAMPLE II

Following the procedure of Example I, using U.S.I.'s Microthene FN-500 polyethylene, various fluorochemicals were thoroughly blended by a sigma blade mixer with the polyethylene for about 15 to 30 minutes at 120° to 150° C. and then the mixture was pressed into film 5 mils thick. The following average peanut oil holdout times were obtained:

| Composition of Film 5 mils thick | Peanut Oil Holdout Hours at 60°C. |
|---|---|
| PE (control) | 80.5 |
| PE + 1% FC | 260 |

The effectiveness of perfluorocyclohexanoyl glycine, which is identified as FC in the above table, can be seen by comparison with the control.

Comparison of Examples I and II also indicates that the impermeability of polyethylene is related to the thickness of the film. The polyethylene used for Example I was a low density polyethylene having a film thickness of 2 mils. Coating and film thickness in commercial use usually ranges from 0.5 to 5 mils.

From the foregoing it will be seen that this invention is well adapted to obtain all of the ends and objects hereinabove set forth, together with other advantages which are obvious and which are inherent to the system. The oleophobicity of olefin polymers is dramatically improved by the addition of small percentages of perfluorocyclohexanoyl glycine. The compositions resulting from blending the fluorochemical with the olefin polymer not only have improved repellency characteristics, but also result in improved extrudability and release from metal parts.

Obviously, many modifications and variations of the present invention as hereinbefore set forth may be made without departing from the spirit and scope thereof and therefore only such limitations should be imposed as are indicated in the appended claims.

What is claimed is:

1. A composition comprising from about 0.1 to about 5 percent by weight perfluorocyclohexanoyl glycine and a solid extrudable olefin polymer.

2. The composition of claim 1 in which the perfluorocyclohexanoyl glycine is present in the amount of between about 0.5 and 2 percent by weight.

3. The composition of claim 1 in which the olefin polymer is a homopolymer.

4. The composition of claim 1 in which the olefin polymer is a copolymer.

5. The composition of claim 1 in which the olefin polymer is polyethylene.

6. The composition of claim 1 in which the olefin polymer is an ethylene copolymer.

7. The composition of claim 1 in which the olefin polymer is polypropylene.

8. The process of producing oleophobic olefin polymers which comprises:
   heating a solid extrudable olefin polymer to its softening temperature,
   adding 0.1 to 5 percent by weight of perfluorocyclohexanoyl glycine to the heated olefin polymer,
   and mixing the perfluorocyclohexanoyl glycine and olefin polymer until a uniform blend is obtained.

9. The process of claim 8 in which the perfluorocyclohexanoyl glycine and the olefin polymer are mixed at a temperature of 120° to 150° C. until a homogenous blend is obtained.

* * * * *